INVENTOR.
GERHARD WEISS
BY
ATTORNEY 3,297,860
SPECTROSCOPIC COMPUTER
Gerhard Weiss, Northford, Conn., assignor to Technical Measurement Corporation, North Haven, Conn., a corporation of Delaware
Filed June 19, 1963, Ser. No. 289,064
9 Claims. (Cl. 235—151.35)

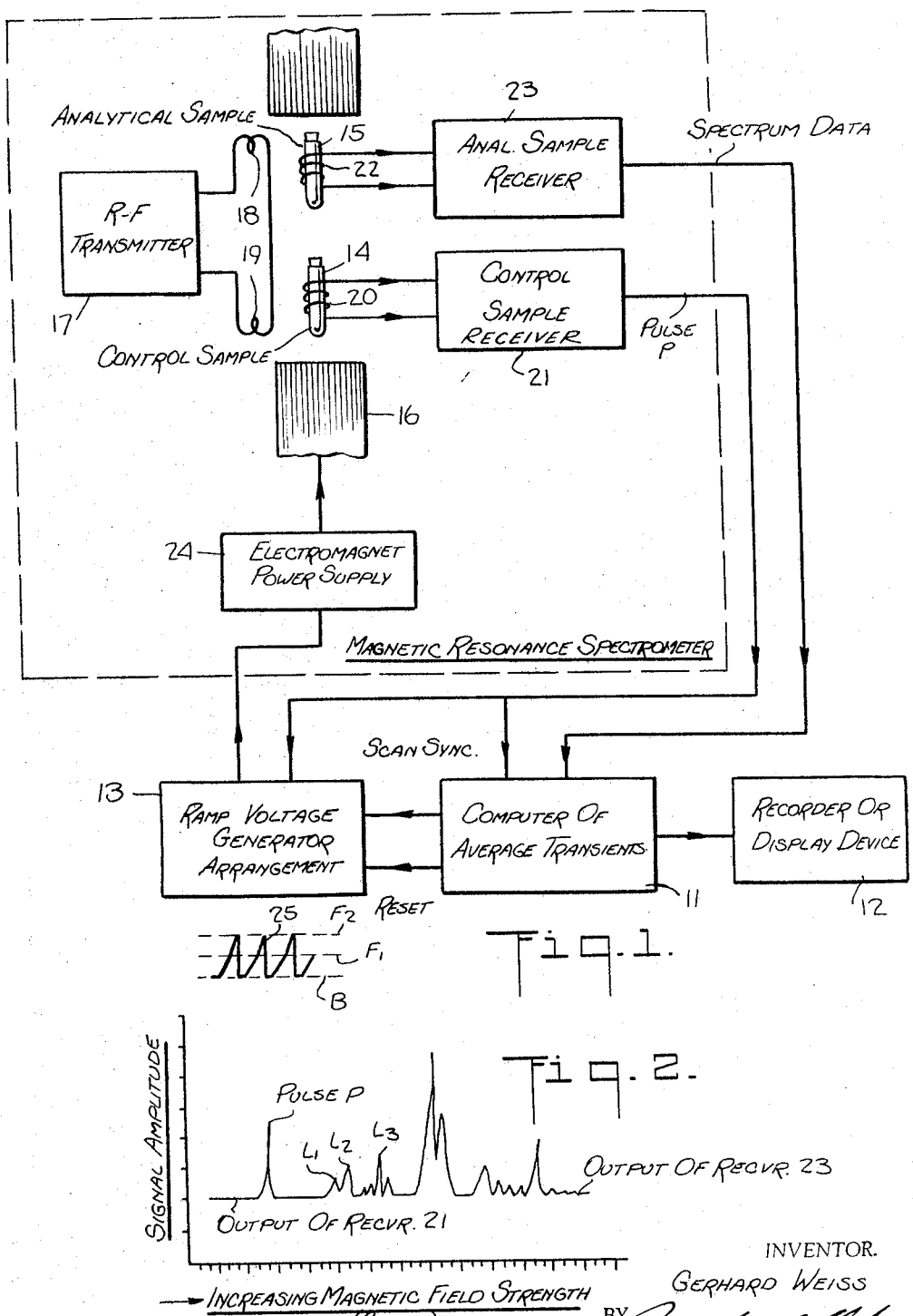

This invention relates generally to spectroscopic techniques for producing spectral patterns indicative of a substance under analysis, and more particularly to a spectroscopic computer system which combines a spectrometer and a computer of average transients whereby spectral patterns are generated repetitively and are averaged so as to magnify distinctions between significant spectral lines and random background noise.

Nuclear magnetic resonance (NMR) spectrometers make possible the rapid and non-destructive analysis of materials. The operation of such instruments is based on the unique ratio of magnetic moment to angular momentum for each type of nucleus, the ratio characterizing the nucleus. Magnetic resonance phenomena occurs by reason of energy transfer between a radio frequency field and a nucleus placed in a constant magnetic field that is sufficiently strong to decouple the nuclear spin from the influence of the atomic electrons.

As expressed by the Larmor equation, the angular frequency for resonance absorption is a function of the gyromagnetic ratio characteristic of the nuclear species and the intensity of the magnetic field to which it is subjected. Hence by varying the intensity of the magnetic field throughout a given range while maintaining the frequency constant, one may develop a spectral line distribution pattern from which it is possible to identify individual components in the mixture under analysis and to make determinations of molecular structure. One is also able, by integrating the spectral responses, to carry out quantitative analysis of the multi-component mixture.

In a nuclear magnetic resonance spectrometer of standard design, the essential component of the system are (a) a radio-frequency transmitter for exciting the sample and a receiver for detecting the resultant resonance signal, (b) an electromagnet for producing a uniform magnetic field which may be swept in intensity throughout a desired range, and (c) a recorder driven in synchronism with the field sweep to produce the resonance spectrum of the material under test.

In order to facilitate calibration of the NMR instrument, it is the conventional practice to include a control sample having a known magnetic resonance characteristic, the control sample and the unknown analytical sample being disposed within the magnetic field adjacent to each other and being excited by the same radio-frequency source. In the course of sweeping the magnetic field intensity, a pulse is first detected in the receiver coupled to the control sample. This reference pulse is indicative of a known value of magnetic field intensity, thereby affording a calibration level from which the pulses received from the analytical sample may be analyzed as the sweep is continued.

In the case of very weak samples or where the spectral line patterns are highly complex and include low-intensity lines, it is often very difficult to discern significant lines which are buried in background noise generated within the spectrometer.

Accordingly, it is the main object of this invention to provide a spectroscopic computer system which combines a spectrometer unit with a computer of average transients, the operation of the two units being so coordinated as to generate spectral patterns repeatedly and to average a predetermined number of successive patterns in a manner magnifying the spectral lines relative to randomly produced phenomena, thereby improving the signal-to-noise ratio.

While the invention will be described herein as applied to NMR spectrometers, it is also useful with other types of spectroscopic instruments which produce spectral line patterns by scanning a control and an analytical sample to generate both a reference line and the distribution lines forming the spectrum of the analytical sample. For example, the invention is applicable also to electron paramagnetic resonance (EPR) spectrometers which are based on the behavior of electrons when subjected to a magnetic field. In EPR instruments, samples are irradiated and are simultaneously subjected to a magnetic field, the electrons behaving according to the Larmor equation. Here too, there is a need to augment the spectral responses as against random noise in order to distinguish the lines therefrom. In general, the invention is useful in any arrangement wherein an analog output of varying amplitude is produced from a sample in the course of sweeping a variable factor.

More specifically, it is an object of the invention to provide a computer system in which the magnetic intensity sweep in the spectrometer unit is controlled by a ramp voltage device generating a recurrent ramp voltage which in each cycle rises progressively from a base value until a first flight level is reached where a reference pulse is derived from the control sample, the reference pulse initiating the operation of the scanning circuit in the averaging computer, the sweep voltage then being caused under the control of the computer to continue its rise in synchronism therewith until a second flight level is reached, at which point the ramp voltage is returned abruptly to its base value and the operating cycle is repeated.

In a computer system in accordance with the invention, the sweep voltage excursion to the first flight operates a searching scan to find the magnetic resonance point of the control sample, whereas the sweep voltage excursion to the second flight operates the spectral scan to develop the line distribution pattern of the analytical sample and simultaneously to scan the computer memory so as to enter said pattern therein. With each synchronized cycle of operation of the spectral scan of the spectrometer unit and of the scanning circuit in the averaging computer, a spectral pattern is entered and stored in the computer, the successive patterns being accumulated therein. By summing a large number of such patterns, each of which is locked to the reference value of magnetic intensity, the random components therein tend to average out, whereas the repeated spectral components which recur at the same time position along the base line are added in amplitude and thereby reinforced.

Also an object of the invention is to provide a computer which is of efficient and reliable design and which is useful not only for averaging the spectral responses but also for recording individual responses calibrated automatically in accordance with an established reference value.

Briefly stated, these objects are attained in a system comprising a spectrometer, a computer of average transients and a control circuit for coordinating the operation of the computer and the spectrometer, the spectrometer comprising means to subject a control sample and an analytical sample to a force whose intensity is swept throughout a prescribed range to produce from the control sample a reference pulse indicative of a known intensity and to produce from said analytical sample an analog voltage pattern representative of its spectrum; the computer comprising means repetitively to sample the input analog pattern along a series of points and to store the sampled values in digital form in a series of memory locations which are scanned sequentially, thereby producing an output analog voltage pattern in which signal components are emphasized relative to random noise components; the control circuit comprising means to coordinate the intensity sweeping the spectrometer with the scanning action of the computer to cause the sweep cyclically to sweep from the starting point of said range to a level at which the reference pulse is produced, at which level the scanning action of the computer is initiated and continues in step with the sweep in the intensity of the spectrometer throughout the remaining portion of said range.

For a better understanding of the invention, as well as other objects and further features thereof, reference is made to the following detailed description of the invention to be read in conjunction with the accompanying drawings, wherein:

FIG. 1 is a simplified block diagram of a spectroscopic computer system in accordance with the invention;

FIG. 2 is a graph indicating the output of the spectrometer unit;

*General description*

Figure 3:
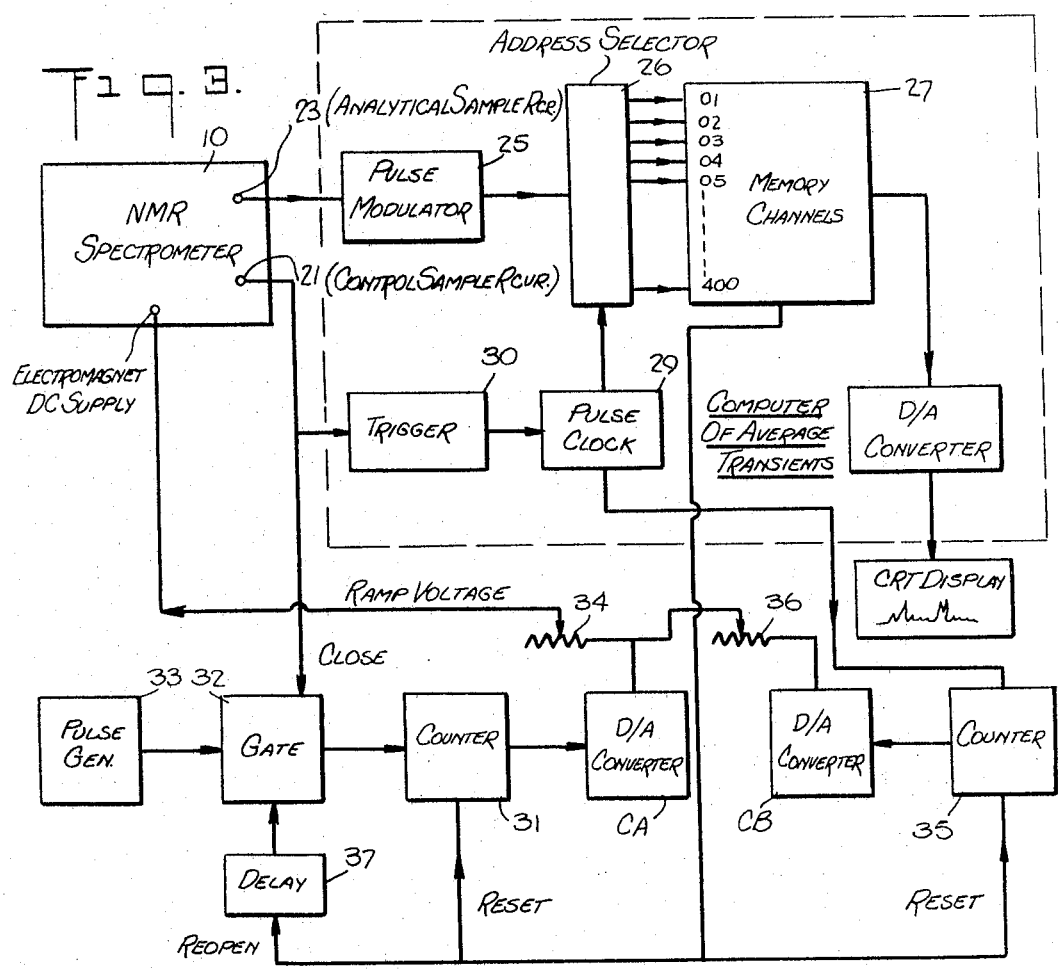
FIG. 3 is a more detailed block diagram of a system in accordance with the invention.

Referring now to FIG. 1, there is shown a spectroscopic computer system comprising an NMR spectrometer generally designated by the numeral 10, a computer of average transients unit 11, whose output is displayed on a cathode ray indicator 12 or recorded on an X-Y plotter, and a ramp voltage generator arrangement 13.

The NMR spectrometer may be of the type known commercially as the "A–60" manufactured by Varian Associates of Palo Alto, California, in which a control sample 14 and an analytical sample 15 are placed within the magnetic field established by an electromagnet 16. The samples are usually in liquid form and are contained within tubes which are adjacent each other. The samples are excited from a radio-frequency transmitter 17 through coils 18 and 19. The resonance response of the control sample picked up by a coil 20 is fed to the control receiver 21, while that of the analytical sample is picked up by a coil 22 and fed to a receiver 23. The electromagnet is energized by a power supply 24 which may be modulated electronically to vary the magnetic field intensity to sweep the samples. In practice, the electromagnet may be provided with two sets of coils, current to one set of coils being stabilized to provide a basic field and current to the other set being modulated to effect the desired sweep throughout a prescribed range.

The operating frequency of the transmitter in the A–60 instrument is 60 mc., but it is to be understood that other frequencies such as 40 mc. and 100 mc. may be used in practice. Other forms of NMR and EPR spectrometers which may constitute the spectrometer unit in the computer system, are disclosed in the texts "NMR and EPR Spectroscopy," Pergamon Press, 1960, by the Varian Staff, and "Nuclear Magnetic Resonance Applications to Organic Chemistry," McGraw-Hill, 1959, by J. P. Pople et all. The invention is also applicable to electron spin resonance spectrometers and mass spectometers.

In operation, the radio-frequency field is maintained constant while the magnetic field strength of the spectrometer is varied by means of the ramp voltage generator arrangement 13 operatively coupled to the power supply 24, the recurrent ramp voltage wave form being shown at 25. The ramp voltage rises progressively from a base value B until a point is reached in the intensity of the magnetic field at which resonance absorption occurs in the control sample 14, with the result that a pulse P is produced in the output of the receiver 21, as represented in FIG. 2, wherein the signal amplitudes of the receiver outputs are plotted in terms of increasing magnetic field strength.

As the sweep continues above the flight level $F_1$ at which the reference pulse P from the control sample is produced, to the flight level $F_2$, the analytical sample receiver 23 yields output pulses at different field intensities constituting the lines $L_1$, $L_2$, $L_3$, $L_4$, etc. which form the spectrum of the material under test. In practice, the variation in field strength may be from a low initial value to a high value, or in the reverse direction.

The reference pulse P after being suitably sharpened is used as a trigger to initiate the operation of the computer of average transients 11, which in practice may be the "CAT" computer manufactured by Technical Measurement Corporation of North Haven, Connecticut. This computer is described in Patent 3,087,487, issued on April 30, 1963, to Manfred E. Clynes, as well as the literature published by Technical Measurement Corporation.

In the CAT computer, which will be disclosed in greater detail in connection with FIG. 3, an analog input, which in this instance is the spectral output of the spectrometer, is sampled along a series of 400 time intervals, the amplitude of the signal at each intervals being converted into a digital count which is stored in a memory "address" in decimal form, 400 such addresses being provided. Each address accumulates the digital count entered therein with repeated sampling scanning cycles. Each sampling cycle is initiated by the reference pulse P derived from the control sample. Obviously a greater number or a smaller number of addresses may be used in such computers.

When the sampling cycle of the computer is initiated by pulse P, the rise of the ramp voltage above level $F_1$ is under the control of the computer, whereby the magnetic intensity sweep of the spectrometer is synchronized with the sampling scan of the computer throughout its series of addresses. At the completion of the sampling scan, which occurs at flight level $F_2$, a reset pulse is applied from the computer to the ramp generator 13 to restore the ramp to the base value B, after which the ramp voltage proceeds to rise again for the next cycle of operation.

Thus the reference pulses produced with repeated magnetic intensity sweeps of the spectrometer act to synchronize the averaging process with the sweep of the analytical sample, with the result that the spectral responses are reinforced, for the additions are all in phase. Activity unrelated to the spectral responses, i.e., noise, will appear out of phase and thus average out. In fact, the noise adds in an r.m.s. fashion, resulting in a signal-to-noise ratio (S/N) improvement by a factor $\sqrt{n}$, where "$n$" is the number of accumulations. After a predetermined number of patterns is entered into the memory device, the respective summed digital counts in the series of addresses may be read out by converting each sum into its analog value and displaying the analog values in sequence on a cathode ray screen to produce the average spectral pattern.

The invention is not limited to average response computers of the CAT type, and may also be used in conjunction with digital computers of the ARC–1 type described by W. A. Clark in the Quarterly Progress Report (Research Lab. Elec. M.I.T.), 1958, pages 114–117.

*The computer of average transients*

Referring now to FIGURE 3, the computer system is shown in greater detail. The output signal of the analytical sample receiver 23 of the spectrometer unit 10, which is essentially an analog voltage, is fed to the pulse-frequency modulator 25 in the computer, the modulator being adapted to generate pulses having a repetition rate which is proportional to the varying amplitude of the signal. The modulator may take the form of an astable asymmetrical multivibrator producing carrier pulses of 100,000 per second, the applied modulation voltage causing the pulse rate to vary accordingly.

Thus the output of the modulator 25 consists of frequency-modulated pulses of identical shape and amplitude whose repetition rate at any instant depends on the instantaneous amplitude of the spectrometer signal. The train of pulses is hereafter referred to as "data" pulses.

The data pulses are directed by an address selector 26 into a memory register 27 composed of a series of memory locations, called addresses, and in the "CAT," four hundred such locations are provided although as pointed out previously, any suitable number may be used. These memory locations appear within a magnetic core memory matrix which acts to store the data pulses. Counter or scalar circuits operate in conjunction with the memory locations to add the pulses stored therein. The accumulated count can be read out at any time through a read-out device 28 to be later described.

The address selector 26 is controlled by a pulse clock 29 which generates a train of clock pulses each time the clock is triggered by a trigger circuit 30. The clock produces a train of four hundred clock pulses which activates the selector 26 to cause it to direct the incoming data pulses to the next memory address in the series thereof each time a clock pulse is received. Thus each time a reference pulse P is received from the spectrometer 10, this sets off the clock 29, which in turn controls the selector 26, whereby the data pulses derived from the spectral signals are entered into successive memory locations.

Thus when the selector operation is initiated by reference pulse P, the data pulses are first entered into the first memory location, then into the second, and so on, until entries are made in sequence to the four hundred addresses during the period of the four hundred clock pulses. This scanning cycle is repeated when the next reference pulse P is received, this time the data pulses being added in the memory to those previously stored therein. After, say, two hundred cycles of operation, each memory channel holds the sum of two hundred spectral responses.

As a result of this operation, the spectral line pattern which is converted into data pulses is effectively cut up into four hundred ordinates. The ordinates are spaced apart in time at the same intervals appearing in the timing pulse train from clock 29. Each ordinate is represented in its associated memory channel by the number of counts in the data pulse train counted during the time interval of that ordinate. Inasmuch as the pulse frequency of the data pulse train is proportional to the instantaneous amplitude of the input, the number of counts accumulated is proportional to the instantaneous amplitude of the specrum at that time, or more exactly to the average value of the input ordinate during the time interval between two timing pulses.

The counts accumulated and summated in the several memory channels are stored therein and may be read out at any time through read-out device 28. The read-out device is essentially a digital-to-analog conversion device which converts the stored numerical value to a voltage whose magnitude is proportional thereto. The readout device is controlled by suitable timing pulses to step consecutively from memory channel to memory channel and thereby provide a series of analog voltages each representative of a respective sum.

The read-out values may be displayed on cathode-ray screen 12 by applying the analog voltages to one set of deflection elements, a timing base or sweep voltage being concurrently applied to the other set of deflection elements to provide a cathode-ray display in which the analog values are presented in rectangular coordinates. The display may, of course, be photographed to provide a record.

A similar display in permanent form may be made by means of a strip chart pen recorder or an X-Y plotter coupled to the read-out device, wherein the four hundred numbers corresponding to the addresses of the memory are read out in the form of closely spaced points on a graph constituting essentially a continuous line representative of the spectral pattern, in which the transient signal is emphasized relative to background noise.

Since the summated responses of the signal accumulate at the same time position within the electrical input, whereas noise tends to be random, by accumulating a great number of responses the signal appearing in the output wave-form on the C-R display tube or on the X-Y plotter becomes clearly discernible.

*The ramp voltage generator*

We will now describe the manner in which the ramp voltage is generated to produce in the course of each generating cycle a search scan to find the nuclear magnetic resonance point of the control sample, followed by a spectral scan to pick up the nuclear magnetic resonance points in the analytical sample.

The ramp voltage generator 13 is constituted by two digital-to-analog converters CA and CB. Applied to converter CA are digits obtained in a pulse counter 31 coupled through an electronic gate 32 to a pulse generator 33.

Figure 4:
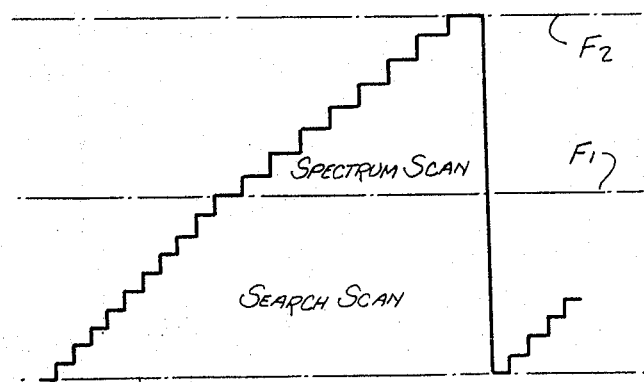
FIG. 4 is a graph indicative of the ramp voltage for controlling the spectrometer sweep.

We shall assume at the outset that no pulses are entered in counter 31, and that the converter CA has a zero output. We shall further assume that the gate 32 is initially open to supply pulses from generator to the counter. Thus the counter output steps one digit at a time as a result of which the converter CA output voltage rises in staircase fashion to flight $F_1$ as indicated in FIG. 4, from a base level B. The output of the converter CA, which may be amplified, is applied through an adjustable potentiometer 34 to the power supply 24 for the electromagnet in the spectrometer, the samples being swept until the control sample produces a reference pulse P, which is assumed to occur at the flight level $F_1$. The pulse P is applied to the trigger 30 in the computer 11 to initiate its operation, and is also applied to gate 32 to close the gate, thus interrupting the supply of pulses from generator 33 to the counter 31 and causing the converter CA to maintain the analog value (at flight $F_1$) representative of the pulse count then stored in the pulse counter 31.

With the initiation of the computer operation, clock pulses are generated which activate the address selector 26 to effect scanning of the data pulses derived from the receiver for the analyzed sample. The clock pulses are at the same time counted in a pulse counter 35, the count thereof being applied to the converter CB, which produces an analog thereof. The output of converter CB is added through the potentiometer 36 to that of the converter CA, the combined ramp voltage output being applied to the electromagnetic power supply 24 to effect intensity control of the magnetic field.

Since the starting point of the combined output is the analog value held in converter CA at the instant gate 32 is closed, the ramp voltage, as shown in FIG. 4, then proceeds to rise in staircase fashion with each clock pulse or a multiple thereof, whereby the spectrum scanning in the spectrometer takes place synchronously with the scanning of the four hundred addresses in the computer.

Thus the data pulses derived from the spectrum scanning are entered sequentially, beginning at a point determined by the reference pulse P, which is indicative of an established value of magnetic field intensity. At the completion of the computer scan, which occurs in the example given, at the 400th address, a control pulse is produced in the output of the computer which is applied to the pulse counters 31 and 35 to re-set same to zero, thereby returning the ramp voltage abruptly to its base level. The control pulse is also applied through a delay circuit 37 to the gate 32 to reopen the gate, whereby pulses from generator 33 are again admitted into counter 31 to initiate the search scanning operation and hence the next cycle of operation.

The potentiometers in the output of the converters CA and CB make it possible to adjust the slope of the two search and spectrum scan ramps individually, so that the most favorable conditions can be achieved. Since no moving or mechanical parts are involved in this ramp generation, there is no practical limit to the number of sweeps that can be generated, other than the storage capacity of the computer itself. Hence as many spectral patterns may be stored and averaged in the computer as the computer can handle, and the entire system can be operated reliably over very long periods to time. The same system may be used to provide a single scan, calibrated by the reference pulse.

While there has been shown what is considered to be a preferred embodiment of the invention, it is to be understood that many changes and modifications may be made therein without departing from the essential spirit of the invention as defined in the annexed claims.

What is claimed is:

1. A spectroscopic computer system comprising:
   (a) a spectrometer including means to subject a control sample and an analytical sample to a force whose intensity is swept throughout a prescribed range, means to derive from said control sample a reference pulse indicative of a known intensity, and means to derive from said analytical sample an analog voltage pattern representative of its spectrum;
   (b) a computer of average transients operatively coupled to said spectrometer and comprising means to convert the input analog pattern along a series of sampling points therein into a series of corresponding digital values, means to store the sampled values in a series of memory channels which are scanned sequentially to produce, with repetitive scanning actions, an output analog pattern in which signal components in said spectrum are emphasized relative to noise components;
   (c) a control circuit to coordinate the action of said spectrometer and computer comprising means cyclically to cause the sweep of said spectrometer to sweep from a starting point in said range to a level at which said reference pulse is produced, and means responsive to said reference pulse to initiate the scanning action of said computer and to maintain the intensity sweep of said spectrometer in synchronism therewith for the balance of said range.

2. A system, as set forth in claim 1, wherein said spectrometer is a nuclear magnetic resonance spectrometer and said force is a magnetic field.

3. A system, as set forth in claim 1, wherein said spectrometer is an electron paramagnetic spectrometer.

4. A system, as set forth in claim 1, wherein said control circuit including a ramp voltage generator which produces a recurrent sweep voltage having a search scan portion below said level and a spectrum scan portion above said level.

5. A spectroscopic computer system comprising:
   (a) a spectrometer including means to subject a control sample and an analytical sample to a constant radio-frequency field and a magnetic field whose intensity is swept throughout a prescribed range, receiver means to derive from said control sample a reference pulse indicative of a known intensity and receiver means to derive from said analytical sample an analog voltage pattern representative of its spectrum;
   (b) a computer of average transients responsive to said spectrometer and comprising means to convert the input analog pattern along a series of sampling points therein in time into a series of digital values, means including a selector to store the sampled values in a series of memory channel which are scanned sequentially to produce with repetitive actions an output analog pattern in which signal components are emphasized relative to noise components; and
   (c) a control circuit to coordinate the action of said spectrometer and computer comprising means cyclically to cause the sweep of said spectrometer to sweep from a starting point to a level at which said reference pulse is produced and means responsive to said reference pulse to initiate the scanning action of said computer and to maintain the intensity sweep of said spectrometer in synchronism therewith for the balance of said range.

6. A spectroscopic computer system comprising:
   (a) a spectrometer including means to subject a control sample and an analytical sample to a force whose intensity is swept throughout a prescribed range, means to derive from said control sample a reference pulse indicative of a known intensity, and means to derive from said analytical sample an analog voltage pattern representative of its spectrum;
   (b) a computer of average transients responsive to said spectrometer and comprising means to convert the input analog pattern into pulses having a repetition rate which varies in proportion to the amplitude of said pattern, selector means to feed said pulses into a series of memory channels, a pulse clock producing timing pulses to control said selector to effect sequential scanning thereof to produce with repetitive actions an output analog pattern in which signal components in said spectrum are emphasized relative to noise components; and
   (c) a control circuit to coordinate the action of said spectrometer and computer comprising means cyclically to cause the sweep of said spectrometer to sweep from a starting point in said range to a level at which said refence pulse is produced and means responsive to said reference pulse to initiate the scanning action of said computer and coupled to said clock to maintain the intensity sweep of said spectrometer in synchronism therewith for the balance of said range.

7. A system, as set forth in claim 6, wherein said control circuit includes a digital-to-analog converter responsive to the number of said clock pulses to produce a staircase ramp voltage to effect the synchronous sweep of said spectrometer.

8. A spectroscopic computer system comprising:
   (a) a spectrometer including electromagnetic means to subject a control sample and an analytical sample to a magnetic field whose intensity is swept throughout a prescribed range, means to derive from said control sample a reference pulse indicative of a known intensity and means to derive from said analytical sample an analog voltage pattern representative of its spectrum;
   (b) a computer of average transients responsive to said spectrometer and comprising means to convert the input analog pattern into pulses having a repetition rate which varies in proportion to the amplitude of the pattern, selector means to feed said pulses into a series of memory channels, a pulse clock producing timing pulses to control said selector to effect sequential scanning thereof, to produce with repetitive actions an output analog pattern in which signal components in said system are emphasized relative to noise components; and
   (c) a control circuit to coordinate the action of said spectrometer and computer comprising a pulse generator, a digital-to-analog converter responsive to the number of pulses produced by said generator to produce a ramp voltage which first rises from the starting point in said range to a level at which said reference pulse is produced and which is thereafter responsive to the number of pulses produced in said clock to cause said ramp voltage to rise until said range is fully swept, said sweep of said spectrometer being controlled by said ramp voltage.

9. In a spectroscopic computer including means to subject a sample to a force whose intensity is swept throughout a prescribed range, said sweep being initiated by a trigger pulse to produce from said sample an analog voltage pattern, a computer of average transients responsive to said analog pattern to convert some into data pulses having a repetition rate which varies in proportion to the amplitudes of the pattern, selector means to feed said data pulses into a series of memory channels, a pulse clock producing timing pulses to control said selector to effect sequential scanning thereof, means to count said timing pulses and to produce a ramp voltage in accordance with said count, and means responsive to said ramp voltage to control the sweep in said intensity.

No references cited.

MALCOLM A. MORRISON, *Primary Examiner.*

M. P. HARTMAN, *Assistant Examiner.*